US006767063B1

(12) United States Patent
Abdella et al.

(10) Patent No.: US 6,767,063 B1
(45) Date of Patent: Jul. 27, 2004

(54) AUTOMOTIVE EASY-ENTRY ASSEMBLY

(75) Inventors: David J. Abdella, Shelby Township, MI (US); Neil G. Goodbred, Northville, MI (US); Paul Golarz, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,436

(22) Filed: Jan. 20, 2003

(51) Int. Cl.[7] ................................................ B60N 2/20
(52) U.S. Cl. ............................. 297/378.12; 297/378.1; 297/344.11
(58) Field of Search .................. 297/378.1, 378.12, 297/378.14, 344.11

(56) References Cited

U.S. PATENT DOCUMENTS

| | | | | |
|---|---|---|---|---|
| 3,940,182 A | * | 2/1976 | Tamura | 297/378.12 X |
| 4,844,542 A | * | 7/1989 | Humer | 297/378.12 X |
| 5,531,503 A | * | 7/1996 | Hughes | 297/378.1 X |
| 5,597,206 A | * | 1/1997 | Ainsworth et al. | 297/378.12 |
| 5,626,392 A | * | 5/1997 | Bauer et al. | 297/378.12 X |
| 5,927,809 A | * | 7/1999 | Tame | 297/378.12 X |
| 6,048,030 A | * | 4/2000 | Kanda et al. | 297/378.1 X |
| 6,231,123 B1 | * | 5/2001 | Tame | 297/378.1 |
| 6,474,739 B1 | * | 11/2002 | Lagerweij | 297/378.12 X |
| 2003/0034683 A1 | * | 2/2003 | Gray | 297/378.1 |

\* cited by examiner

Primary Examiner—Rodney B. White
(74) Attorney, Agent, or Firm—Bill Panagos

(57) ABSTRACT

An automotive easy-entry assembly 10 is provided, including a seat pan 12 and a back frame 14 rotatably attached to the seat pan 12. The back frame is rotatable between a back frame upright position 16 and a back frame dumped forward position. A secured track 28 includes a plurality of engagement slots 44 and a memory block 92. An adjustment track 36 is mounted to the seat pan 12 and slidably engages the secured track 28. A locking arm 46 including one or more engagement teeth 44 is mounted to the adjustment track 36 and is movable between an engagement position 50 and a travel position 52. An actuator arm 62 is in communication with the back frame 14 such that as the back frame 14 is moved into the back frame dumped forward position 18 the actuator arm 62 is moved into an actuator active position 68. A lifting cam 72 is in communication with the actuator arm 62 and locking arm 26 such that as said actuator arm 62 is moved into the actuator active position 68, the lifting cam 72 moves the locking arm 46 into the travel position 52. A locking cam 80 is in communication with the lifting cam 72. A searing cam 84 is in communication with the lifting cam 72 such that the sear element 86 engages the locking cam 80 when the locking arm 46 is in the travel position 52. A trigger element 90 disengages the sear element 86 and allows the locking arm 46 to move into the engagement position 50 after impacting the memory block 92. A lost motion element 94 provides communication between the sear cam 84 and the lifting cam 72 such that the trigger element 90 can move over the memory block 92 without damage.

16 Claims, 7 Drawing Sheets

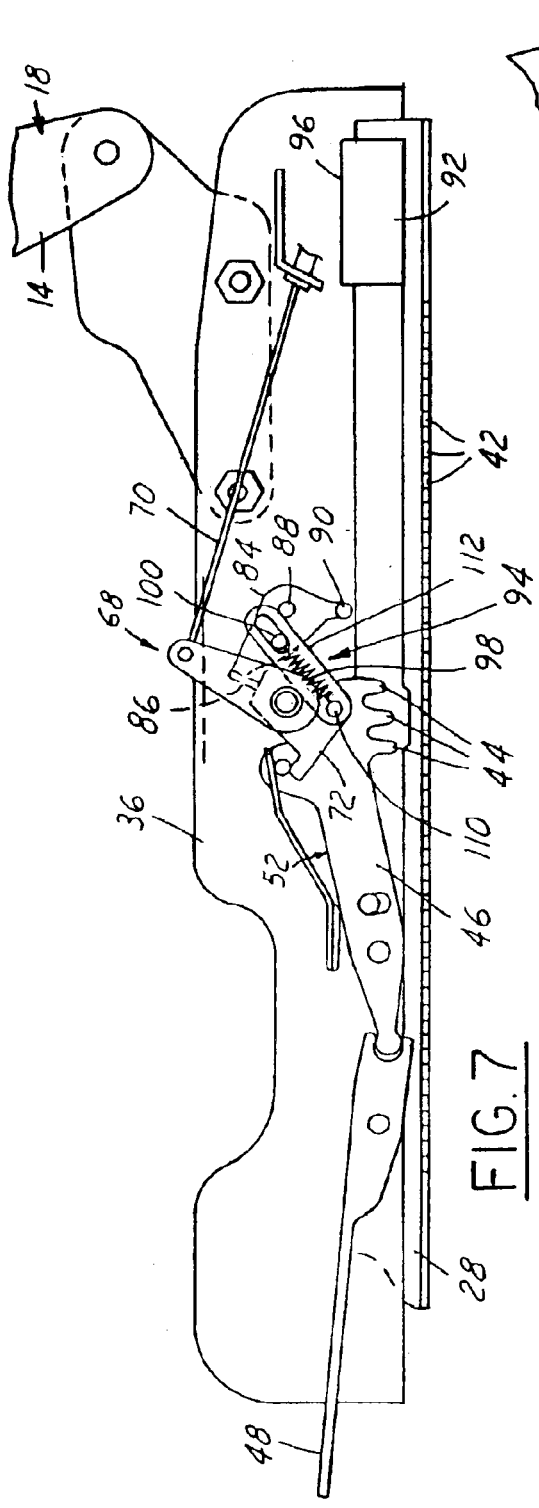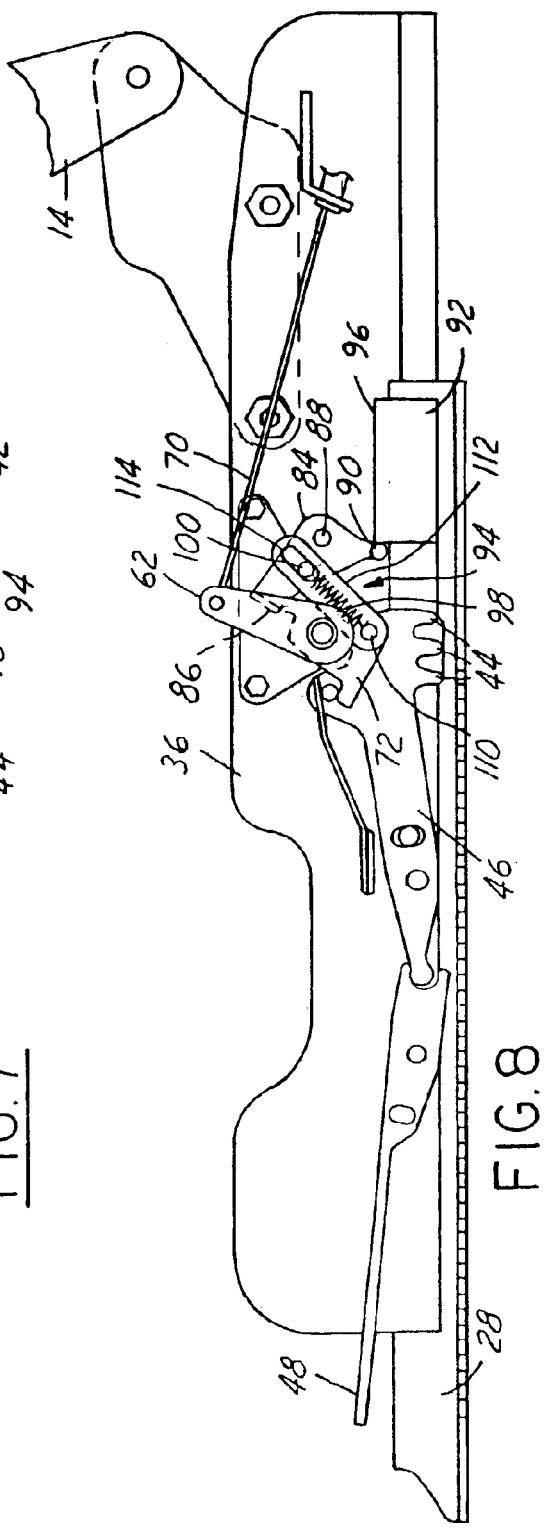
FIG. 7
FIG. 8

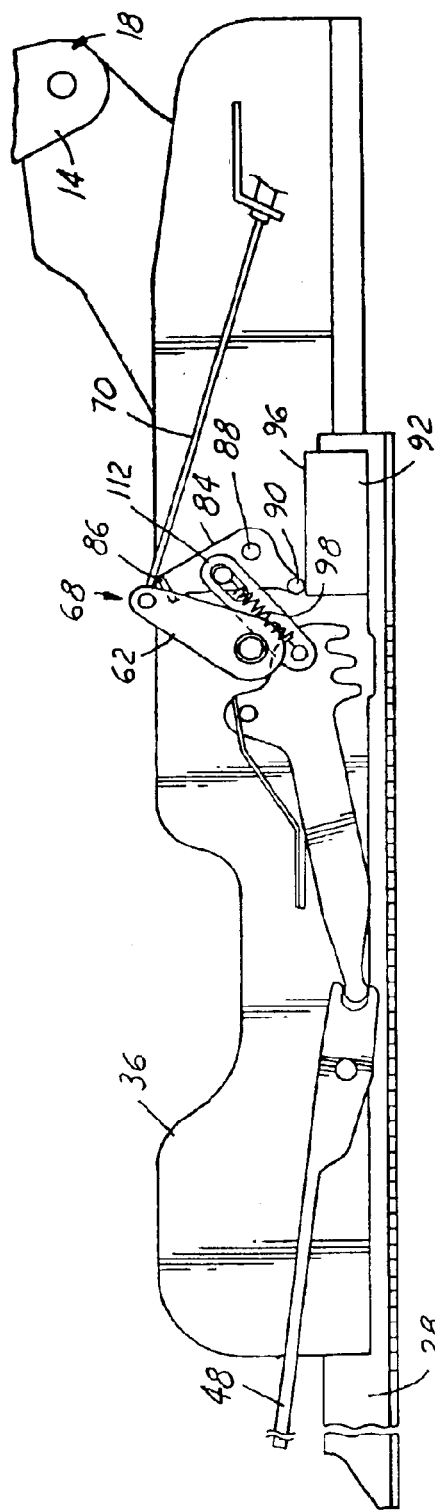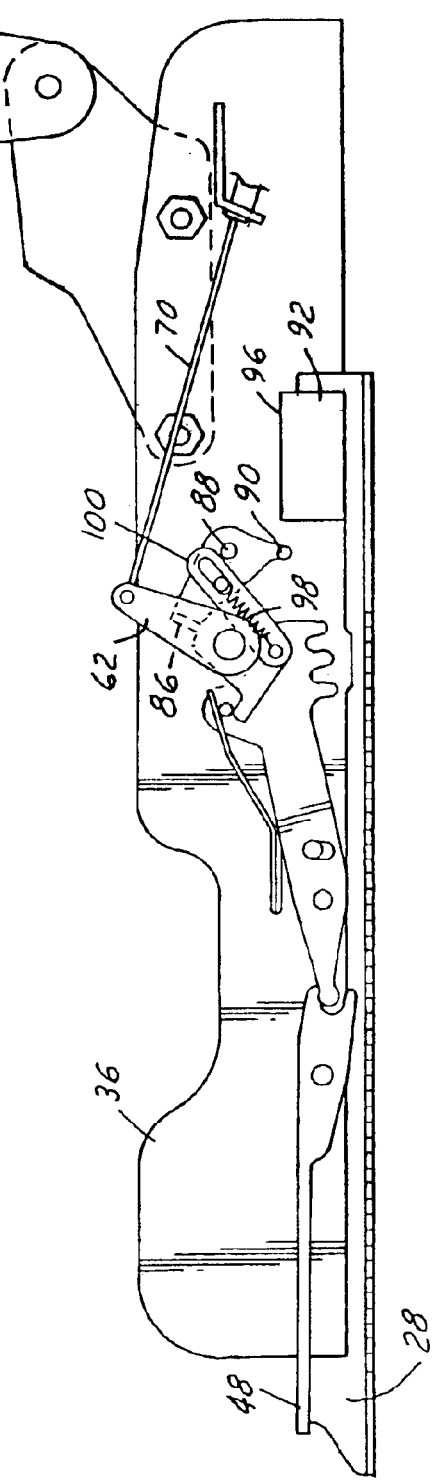

AUTOMOTIVE EASY-ENTRY ASSEMBLY

BACKGROUND OF INVENTION

The present invention relates generally to an automotive easy-entry assembly and more specifically to an automotive easy-entry assembly with improved robust design features.

Automotive components must often function with duplicity of purpose during operation of the vehicle. Primary functions must coexist with a host of additional capabilities in order to provide the desired functionality of a given component. Such is the case with automotive seat designs. Automotive seating is designed with the primary function of providing a comfortable and safe location for passengers within the automobile. Although a variety of improvements can be implemented with these primary functions in mind, an automotive seat must often provide additional functionality.

One such additional function is commonly referred to as "easy entry" functionality. This allows the back of the seat to be dumped forward for access to rear seating or compartments behind the primary seat. This feature is particularly beneficial in two-door automotive designs wherein access to both the forward seating as well as the rear seating is provided by way of entry through a single door. Often the dump-forward feature is provided in combination with forward motion feature for further convenience. In these designs when the dump-forward feature is engaged, the seat assembly is shifted forward to provide increased access to rear compartments/seats.

Although a variety of easy entry designs are known within the prior-art, they often incorporate known disadvantages that leave considerable room for improvement. One such disadvantage stems from early re-engagement of the seat assembly when the back of the seat is moved into the upright position often securing it in a completely forward position. To counter this, designs have incorporated trigger mechanisms that keep the seat assembly unlocked until moved rearward to encounter a memory block. It has been discovered, however, that if the back seat remains dumped forward while the seat assembly is shifted back the trigger mechanism can impact the memory block without the ability to engage the seat lock (since the back seat remains dumped forward). This can result in impact damage to the trigger mechanism as it becomes the sole restraint against further seat rearward movement. Impact damage can prevent proper functioning of the seat locking mechanisms and is therefore highly undesirable.

An additional disadvantage of present designs can stem from their complex gearing assemblies that must be incorporated into a seat assembly design prior to manufacturing. This can require manufacturing assemblies to choose between the cost disadvantages of incorporating easy entry functionality into every seat (when often not need/desired outside front passenger side seating) or alternatively introducing costly multiple design manufacturing. An alternative design that provided an easy entry mechanism that could be installed in a modular fashion to a seat assembly would provide benefits to design and manufacturing. A modular design would allow a customer to produce a single design seat assembly and choose to add an easy entry functionality only when desired during manufacturing. This would improve both the cost and time of manufacturing.

It would therefore be highly desirable to have an automotive easy-entry assembly with improved robust features to prevent damage to the trigger mechanism when the seat is moved rearward while the back is in the dumped forward position. It would further be highly desirable to develop an automotive easy-entry assembly capable of being installed within a seat assembly in a modular arrangement.

SUMMARY OF INVENTION

It is therefore an object to the present invention to provide an automotive easy-entry assembly with improved robust design features. It is further object to the present invention to provide an automotive easy-entry assembly with modular features for improved design and manufacturing considerations.

In accordance with the objects of the present invention an automotive easy-entry assembly is provided. The automotive easy-entry assembly includes a seat pan. A back frame is rotatably attached to the seat pan and is movable between a back frame upright position and a back frame dumped forward position. A secured track is provided including a plurality of engagement holes formed along the length of the secured track. A memory block is mounted to the secured track. An adjustment track is mounted to the seat frame and slidably engages the secured track. A locking arm including a plurality of engagement teeth is rotatably mounted to the adjustment track. The locking arm is movable between an engagement position, wherein the plurality of engagement teeth are positioned within the plurality of engagement holes, and a travel position allowing the adjustment track to slide along the secured track. An actuator arm, rotatable about an actuator axis, is in communication with the back frame such that as the back frame is moved from the back frame upright position to the back frame dumped forward position the actuator arm is moved from an actuator stable position to an actuator active position. A lifting cam is in communication with the actuator arm and the locking arm such that as said actuator arm is moved into the actuator active position the lifting cam moves the locking arm into the travel position. A locking cam is mounted to the lifting cam and includes a locking element. A searing cam, rotatable about a searing cam axis, includes a sear element. The searing cam is in communication with the lifting cam such that the sear element engages the locking element when the locking arm is in the travel position. A trigger element, mounted on the searing cam, upon impact with the memory block when the back frame is in the back frame upright position, releases the locking element allowing the locking element to move from the travel position into the engagement position. A lost motion element provides communication between the sear cam and the lifting cam such that the trigger element, upon impact with the memory block when the back frame is in the back frame dumped forward position, can rotate the searing cam such that the trigger element is moved over the memory block.

Other objects and features of the present invention will become apparent when viewed in light of the detailed description and preferred embodiment when taken in conjunction with the attached drawings and claims.

BRIEF DESCRIPTION OF DRAWINGS

FIG. 5 an alternate view detail illustration of the easy-entry modular assembly illustrated in FIG. 4;

FIG. 7 is a detail illustration of the automotive easy-entry assembly in accordance with the present invention, the automotive easy-entry assembly illustrated in a travel forward position;

FIG. 8 is a detail illustration of the automotive easy-entry assembly in accordance with the present invention, the automotive easy-entry assembly illustrated in a dumped first impact position;

FIG. 9 is a detail illustration of the automotive easy-entry assembly in accordance with the present invention, the automotive easy-entry assembly illustrated in a dumped second override position;

FIG. 10 is a detail illustration of the automotive easy-entry assembly in accordance with the present invention, the automotive easy-entry assembly illustrated in a upright first impact position.

DETAILED DESCRIPTION

Figure 1:
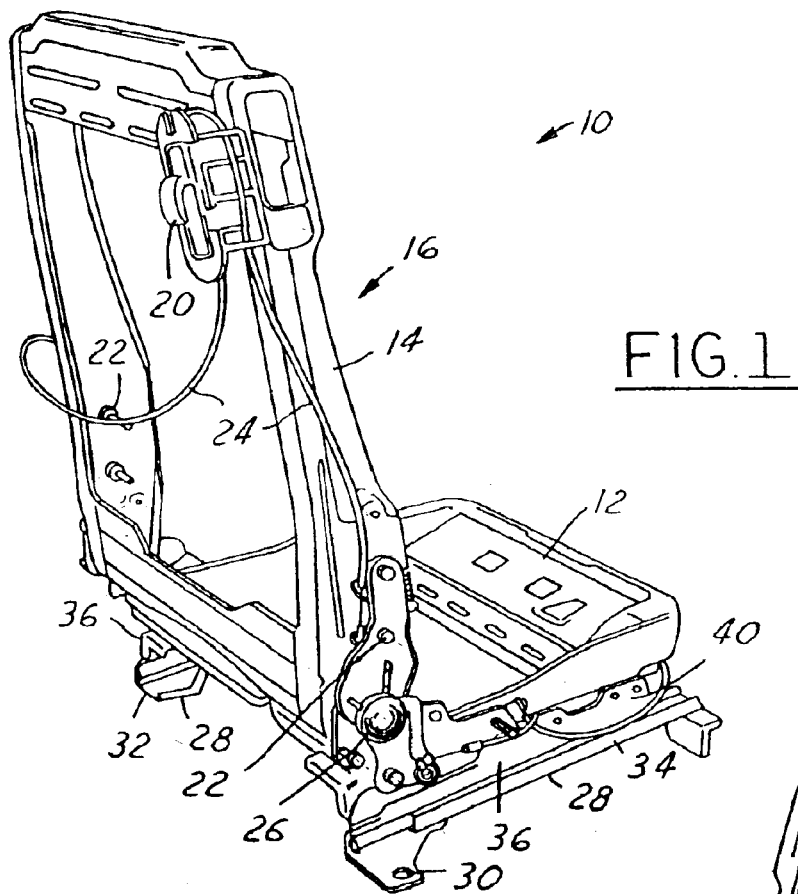
FIG. 1 is an illustration of an automotive easy-entry assembly in accordance with the present invention.
Figure 2:
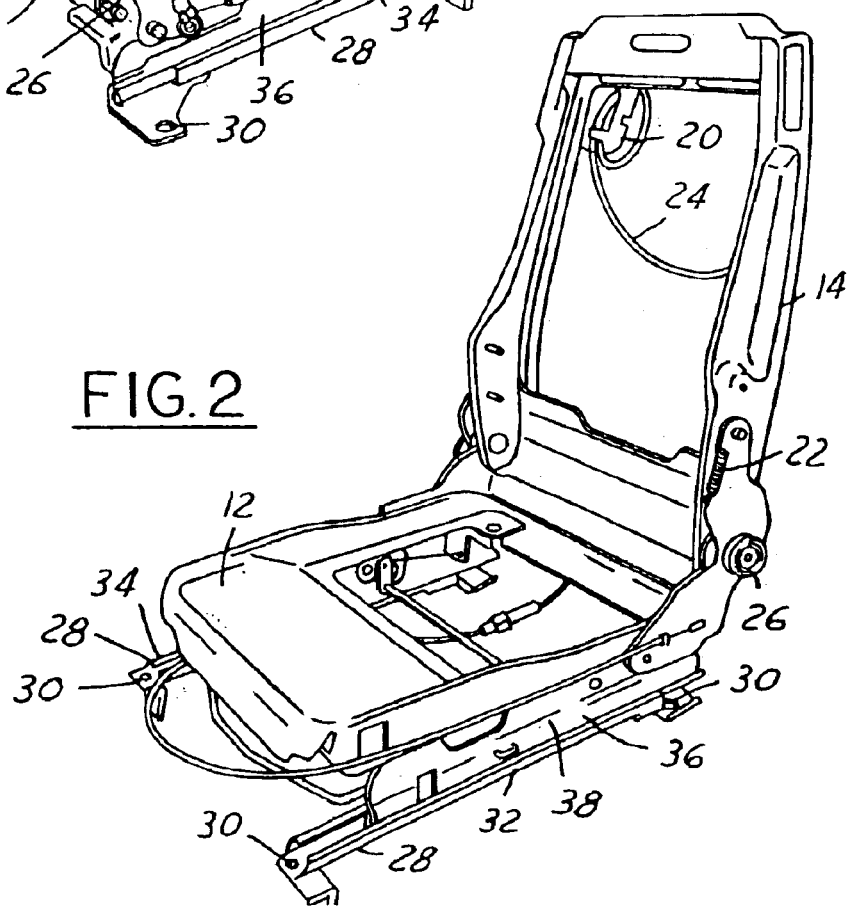
FIG. 2 is an alternate view illustration of the automotive easy-entry assembly shown in FIG. 1.

Referring now to FIGS. 1 and 2, which are illustrations of an embodiment of an automotive easy-entry assembly 10 in accordance with the present invention. The automotive easy-entry assembly 10 includes a seat pan 12 and a back frame 14. The back frame 14 is rotatably attached to the seat pan 12 such that it can be moved between a back frame upright position 16 and a back frame dumped forward position 18 (see FIG. 7). Although it is contemplated that the back frame 14 may be operated in a variety of fashions, one embodiment contemplates the use of a back frame release lever 20 in communication with one or more back frame locking mechanisms 22 by way of release cables 24. Through activation of the back frame release lever 20, the back frame locking mechanisms 22 can be disengaged and the back frame 14 can be rotated about a pair of back frame rotational joints 26 connecting the back frame 14 to the seat pan 12. It should be understood that a wide variety of back frame locking mechanisms are known in the prior art and contemplated by the present invention.

The automotive easy-entry assembly 10 further includes a secured track 28. The secured track 28 is intended for mounting to the vehicle floor (not shown) by any of a variety of methods including, but not limited to bolting the secured track to the vehicle floor/frame. The secured track 28 can therefore include a plurality of secured track mounting slots 30 formed to accommodate the bolts necessary to mount it to the vehicle floor. It should be understood that the term secured track 28 is intended to cover any number of individual tracks such as the secured left track 32 and the secured right track 34 illustrated in FIGS. 1 and 2. An adjustment track 36 is mounted to the seat pan 12 and slidably engages the secured track 28. This allows the seat pan 12 and the back frame 14 to be slid into a variety of positions along the secured track 28. Again, the term adjustment track 36 is intended to cover any number of individual tracks such as the adjustment left track 38 and the adjustment right track 40 illustrated in FIGS. 1 and 2.

Figure 4:
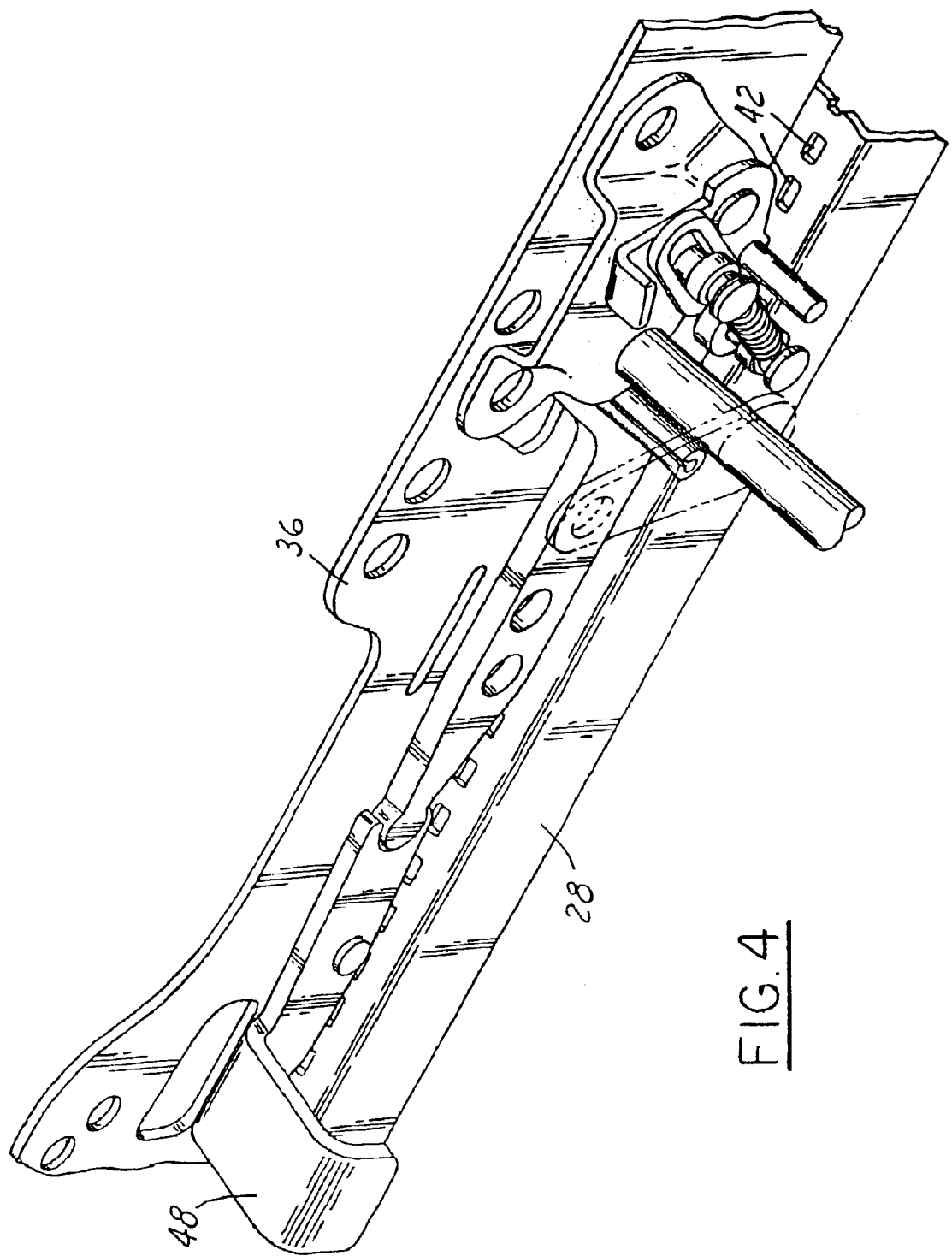
FIG. 4 is a detail illustration of the easy-entry modular assembly from FIG. 3 illustrated mounted to the adjustable track in accordance with the present invention.
Figure 6:
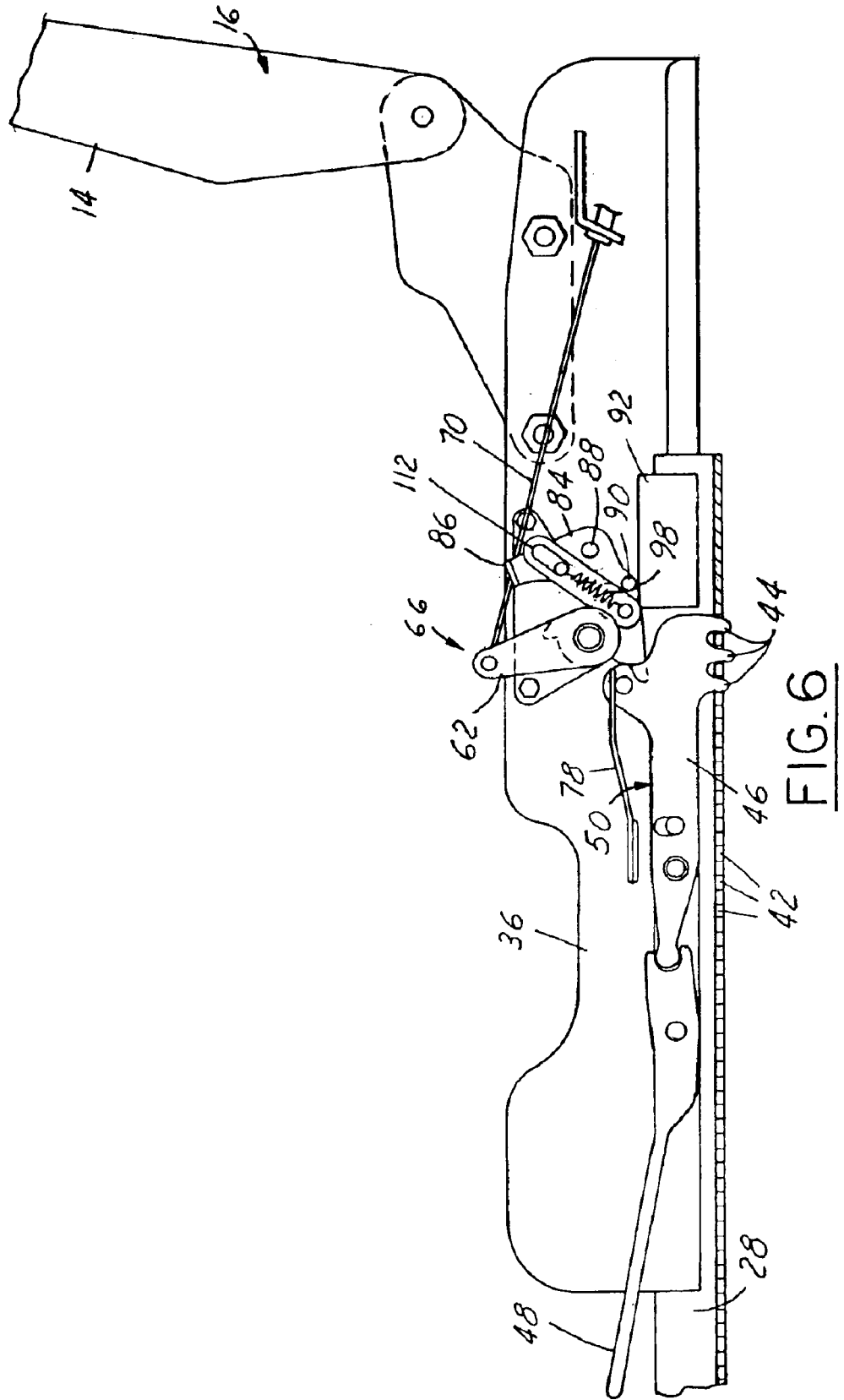
FIG. 6 is a detail illustration of the automotive easy-entry assembly in accordance with the present invention, the automotive easy-entry assembly illustrated in a secured upright position.

The secured track 28 includes a plurality of engagement slots 42 (see FIG. 4) formed along its length. The plurality of engagement slots 42 can be formed in a variety of shapes and sizes. Preferably, however, they are designed to correspond with one or more engagement teeth 44 (see FIG. 7) formed on a locking arm 46 that is rotatably attached to the adjustment track 36. In this fashion, the adjustment track 36 can be secured in a variety of positions along the secured track 28 by positioning one or more engagement teeth 44 within a group of the plurality of engagement slots 42. Normal passenger seat adjustment may be accomplished through the use of a forward adjustment bar 48 in communication with the locking arm 46. A passenger can raise the forward adjustment bar 48 such that the locking arm 46 is moved from an engagement position 50 (see FIG. 6), wherein the one or more engagement teeth 44 are positioned within a group of the plurality of engagement slots 42, to a travel position 52 (see FIG. 7), wherein the adjustment track 36 is free to slide along the secured track 28.

Figure 3:
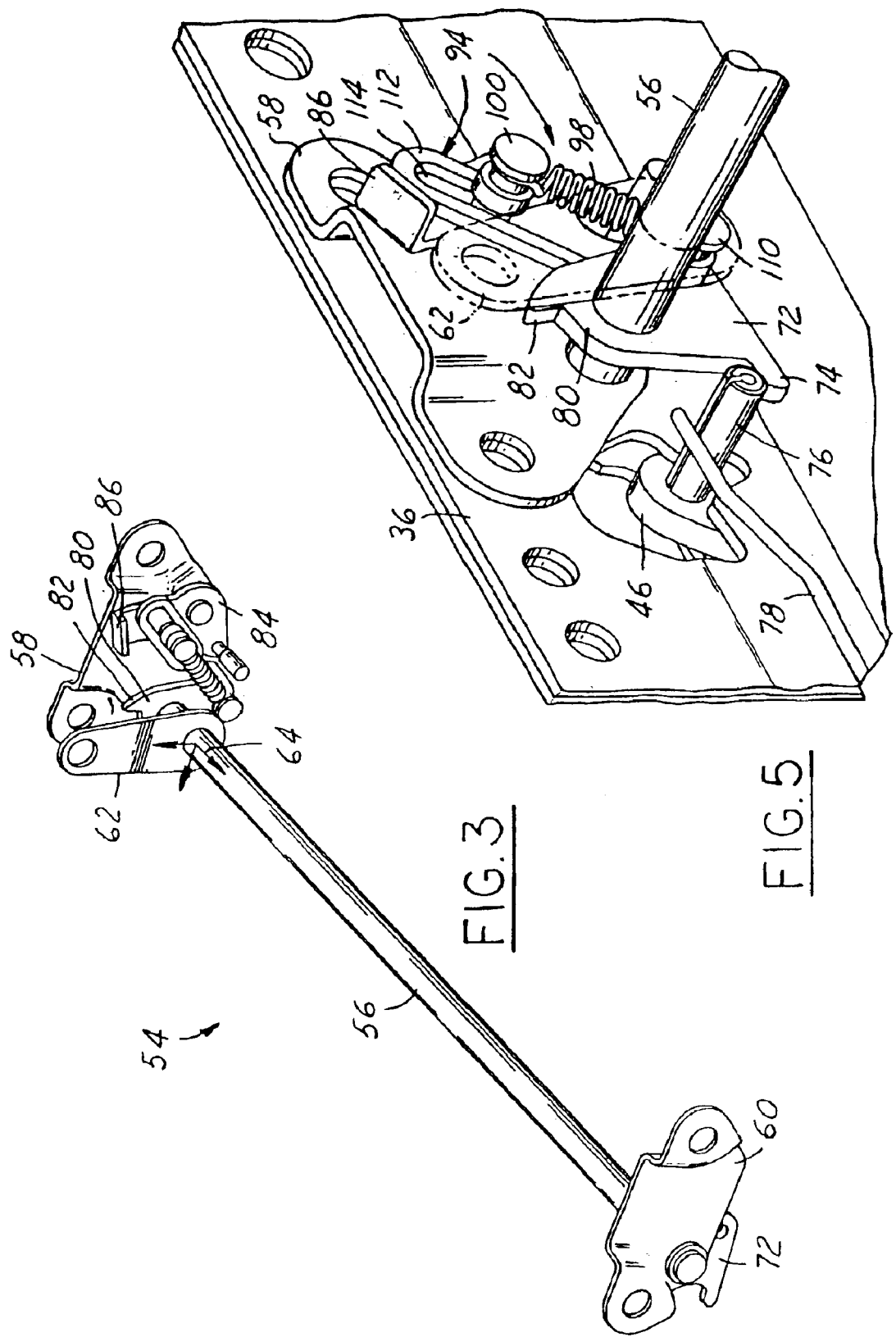
FIG. 3 is a detail illustration of an easy-entry modular assembly for use in the automotive easy-entry assembly illustrated in FIG. 1.

The present invention further contemplates the use of a modular easy entry sub-assembly 54 as illustrated in FIG. 3. The modular easy entry sub-assembly 54 allows easy entry features to by simply added to a seat assembly as an option rather than requiring a costly and time intensive individual production. The modular sub-assembly 54 includes a drive axle 56 rotationally secured between a first mounting bracket 58 and a second mounting bracket 60. The mounting brackets 58,60 can be easily attached to the adjustment track 36 (see FIGS. 4 and 5) during assembly utilizing any of a wide variety of known attachment elements such as bolts. The modular sub-assembly further includes an actuator arm 62 rotatable about an actuator axis 64. Although a variety of actuator axis 64 are contemplated, one embodiment contemplates mounting the actuator arm 62 to the drive axle 56. The actuator arm 62 is in communication with the back frame 14 such that as the back frame 14 is moved from the back frame upright position 16 to the back frame dumped forward position 18 the actuator arm 62 is moved from an actuator stable position 66 (see FIG. 6) to an actuator active position 68 (see FIG. 7). Although this may be accomplished in a variety of fashions, one embodiment contemplates the use of an back frame actuator cable 70 (see FIG. 6) in communication with the actuator arm 62 and the back frame 14 such that as the back frame 14 is moved into the back frame dumped forward position 18, the actuator arm 62 is pulled rearward into the actuator active position 68. Other forms of communication between the back frame 14 and the actuator arm 62 are contemplated by the present invention.

The sub-assembly 54 further includes a lifting cam 72 (see FIG. 5) in communication with the actuator arm 62. The lifting cam 72 is in communication with both the actuator arm 62 and the locking arm 46 such that as the actuator arm 62 is moved into the actuator active position 68 the lifting cam 72 moves the locking arm 46 into the travel position 52. One embodiment of this communication is achieved by mounting the lifting cam 72 to the drive axle 56 such that as the actuator arm 62 rotates the drive axle 56, the lifting cam 72 is rotated. Communication between the lifting cam 72 can also be accomplished through a variety of fashions. One embodiment contemplates utilizing a lifting tab 74, mounted on the lifting cam 72, to engage a locking arm pin 76 mounted on the locking arm 46. Thus as the back frame 14 is moved into the back frame dumped forward position 18, the locking arm 46 is moved up into the travel position 52. A biasing spring 78 may be utilized to bias the locking arm 46 towards the engagement position 50. The sub-assembly 54 preferably includes a first and second lifting cam 72 (see FIG. 3).

The present invention further includes a locking cam 80 mounted in communication with the lifting cam 72.

Although this may be accomplished in a variety of fashions, the embodiment illustrated in FIG. 5 indicates a locking cam 80 and lifting cam 72 formed as a single element mounted to the drive axle 56. The locking cam 80 preferably includes at least one locking element 82 mounted on the locking cam 80. The locking element 82 is designed to be engaged by a searing cam 84 having a sear element 86. The searing cam 84 rotates about a searing axis 88 and is in communication with the lifting cam 72 such that the sear element 86 engages the locking element 82 when the locking arm 46 is in the travel position 52. Thus, when the back frame 14 and seat pan 12 are shifted forward after a back frame dump forward 18, if the back frame 14 is returned to the back frame upright position 16 the locking cam 80 keeps the locking arm 46 in the travel position while the seat pan 1. is slid backwards (see FIG. 10).

Figure 11:
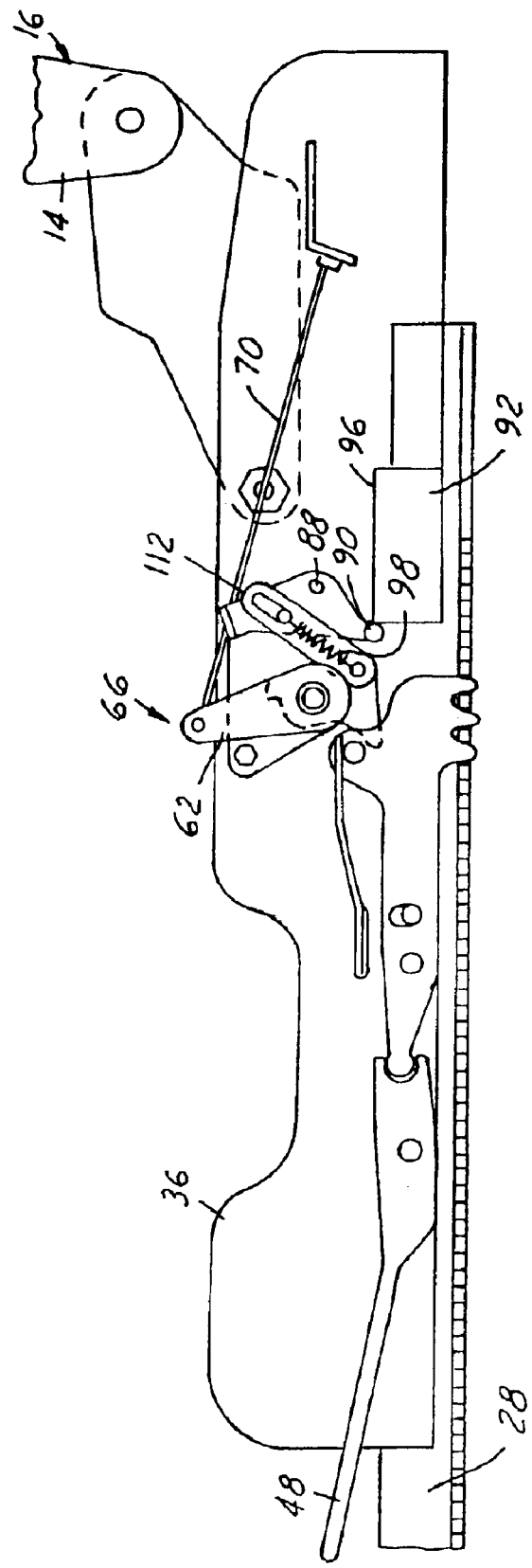
FIG. 11 is a detail illustration of the automotive easy-entry assembly in accordance with the present invention, the automotive easy-entry assembly illustrated in a return locked position.

It is desirable, however, to reengage the locking arm 46 once a certain degree of rearward travel has been seen. Thus the present invention further includes a trigger element 90 mounted on the searing cam 84. The trigger element 90, when the back frame 14 is in said back frame upright position, 16, impacts with a memory block 92 mounted on the secured track 28 (see FIG. 10). The impact of the trigger element 90 rotates the searing cam 84 which in turn disengages the sear element 86 from the locking element 82 and allows the locking arm 46 to move from the travel position 52 to the engagement position 50 (see FIG. 11). Thus the one or more engagement teeth 44 become positioned within a group of the plurality of engagement holes 42 and the adjustment track 36 becomes secured in a single position to the secured track 28. A wide variety of memory blocks 92 are contemplated by the present invention. A memory block 92 may be affixed to the secured track 28 in a position desired by the customer during manufacturing. In other embodiments, the memory block 92 maybe moved mechanically or electrically after installation in the vehicle.

An important feature of the present invention stems from the seat pan 12 being moved rearward while the back frame 14 is kept in the back frame dumped forward position 18. In this scenario it might be possible for the trigger element 90 to transfer impact loading into the sub-assembly 54 were it not for an additionally unique feature of the present invention. The searing cam 84 is placed in communication with the lifting cam 72 by way of a lost-motion element 94. The lost motion element 94 provides communication such that the trigger element 90, upon impact with the memory block 92 when the back frame 14 is in the back frame dumped forward position 18 (see FIG. 8), rotates the searing cam 84 such that the trigger element is 90 moved up over the memory block upper surface 96 without damage (see FIG. 9). Although a variety of lost-motion elements 94 are contemplated by the present invention, one embodiment contemplates the use of a spring element 98 connecting a searing cam pin 100 to a lifting cam pin 110. Another embodiment further contemplates the lost-motion element 94 including a guide element 112 having a slotted guide 114, the slotted guide engaging the searing cam pin 100. The guide element 112 serves to control motion of the searing cam 84 such that it remains in desired alignment throughout its motion. The guide element 112, however, also allows the lost motion that permits the trigger element 90 to rotate over the memory block upper surface 96 when necessary to prevent damage.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive easy-entry assembly comprising:

a seat pan;

a back frame rotatably attached to said seat pan, said back frame rotatable between a back frame upright position and a back frame dumped forward position;

a secured track comprising a plurality of engagement slots;

a memory block mounted to said secured track;

an adjustment track mounted to said seat pan and slidably engaging said secured track;

a locking arm including one or more engagement teeth, said locking arm rotatably mounted to said adjustment track and movable between an engagement position, wherein said locking arm one or more engagement teeth are positioned within a group of said plurality of engagement slots, and a travel position, wherein said adjustment track is free to slide along said secured track;

an actuator arm rotatable about an actuator axis, said actuator arm in communication with said back frame such that as said back frame is moved from said back frame upright position to said back frame dumped forward position said actuator arm is moved from an actuator stable position to an actuator active position;

a lifting cam in communication with said actuator arm and said locking arm such that as said actuator arm is moved into the actuator active position said lifting cam moves said locking arm into said travel position;

a locking cam in communication with said lifting cam, said locking cam including a locking element;

a searing cam rotatable about a searing cam axis and including a sear element, said searing cam in communication with said lifting cam such that said sear element engages said locking element when said locking arm is in the travel position;

a trigger element mounted on the searing cam, said trigger element, upon impact with said memory block when said back frame is in said back frame upright position, disengages said sear element from said locking element allowing said locking arm to move from said travel position to said engagement position;

a lost motion element providing communication between said sear cam and said lifting cam such that said trigger element, upon impact with said memory block when said back frame is in said back frame dumped forward position, rotates said searing cam such that said trigger element is moved over said memory block without damage; and a forward adjustment bar in communication with said locking arm, said forward adjustment bar moving said locking arm into said travel position when lifted.

2. An automotive easy-entry assembly comprising:

a seat pan;

a back frame rotatably attached to said seat pan, said back frame rotatable between a back frame upright position and a back frame dumped forward position;

a secured track comprising a plurality of engagement slots;

a memory block mounted to said secured track;

an adjustment track mounted to said seat pan and slidably engaging said secured track;

a locking arm including one or more engagement teeth, said locking arm rotatably mounted to said adjustment track and movable between an engagement position, wherein said one or more engagement teeth are positioned within a group of said plurality of engagement slots, and a travel position, wherein said adjustment track is free to slide along said secured track;

an actuator arm rotatable about an actuator axis, said actuator arm in communication with said back frame such that as said back frame is moved from said back frame upright position to said back frame dumped forward position said actuator arm is moved from an actuator stable positioned to an actuator active position;

a lifting cam in communication with said actuator arm and said locking arm that as said actuator arm is moved into the actuator active position said lifting cam moves said locking arm into said travel position;

a locking cam in communication with said lifting cam, said locking cam including a locking element;

a searing cam rotatable about a searing cam axis and including a sear element, said searing cam in communication with said lifting cam such that said sear element engages said locking element when said locking arm is in the travel position;

a trigger element mounted on the searing cam, said trigger element, upon impact with said memory block when said frame is in said back frame upright position, disengages said sear element from said locking element allowing said locking arm to move from said travel position to said engagement position; and a lost motion element providing communication between said sear cam and said lifting cam such that said trigger element, upon impact with said memory block when said back frame is in said back frame dumped forward position, rotates said searing cam such that said trigger element is moved over said memory block without damage;

wherein said lost motion element comprises a spring element mounted to and in communication between said sear cam and said lifting cam.

3. An automotive easy-entry assembly as described in claim 2, wherein said lost motion element further comprises a guide element including a slotted guide mounted to and in communication between said sear cam and said lifting cam.

4. An automotive easy-entry assembly comprising:

a seat pan;

a back frame rotatably attached to said seat pan, said back frame rotatable between a back frame upright position and a back frame dumped forward position;

a secured track comprising a plurality of engagement slots;

a memory block mounted to said secured track;

an adjustment track mounted to said seat pan and slidably engaging said secured track;

a locking arm including one or more engagement teeth, said locking arm rotatable mounted to said adjustment track and movable between an engagement position, wherein said one or more engagement teeth are positioned within a group of said plurality of engagement slots, and a travel position, wherein said adjustment track is free to slide along said secured track;

an actuator arm rotatable about an actuator axis, said actuator arm in communication with said back frame such that as said back frame is moved from sad back frame upright position to said back frame dumped forward position said actuator arm is moved from an actuator stable position to an actuator active position;

a lifting cam in communication with said actuator arm and said locking arm such that as said actuator arm is moved into the actuator active position said lifting cam moves said locking arm into said travel position;

a locking cam in communication with said lifting cam, said locking cam including a locking element;

a searing cam rotatable about a searing cam axis and including a sear element, said searing cam in communication with said lifting cam such that said sear element engages said locking element when said locking arm is in the travel position;

a trigger element mounted on the searing cam, said trigger element, upon impact with said memory block when said back frame is in said back frame upright position, disengages said sear element from said locking element allowing said locking arm to move from said travel position to said engagement position; and a lost motion element providing communication between said sear cam and said lifting cam such that said trigger element, upon impact with said memory block when said back frame is in said back frame dumped forward position, rotates said searing cam such that said trigger element is moved over said memory block without damage;

wherein said locking cam and said lift cam are formed as a single element.

5. An automotive easy-entry assembly comprising:

a seat pan;

a back frame rotatably attached to said seat pan, said back frame rotatable between a back frame upright position and a back frame dumped forward position;

a secured track comprising a plurality of engagement slots;

a memory block mounted to said secured track;

an adjustment track mounted to said seat pan and slidably engaging said secured track;

a locking arm including one or more engagement teeth, said locking arm rotatably mounted to said adjustment track and movable between an engagement position, wherein said one or more engagement teeth are positioned within a group of said plurality of engagement slots, and a travel position, wherein said adjustment track is free to slide along said secured track;

an actuator arm rotatable about an actuator axis, said actuator arm in communication with said back frame such that as said back frame is moved from said back frame upright position to said back frame dumped forward position said actuator arm is moved from an actuator stable position to an actuator active position;

a lifting com in communication with said actuator arm and said locking arm such that as said actuator arm is moved into the actuator active position said lifting cam moves said locking arm into said travel position;

a locking cam in communication with said lifting cam, said locking cam including a locking element;

a searing cam rotatable about a searing cam axis and including a sear element, said searing cam in communication with said lifting cam such that said sear element engages said locking element when said locking arm is in the travel position;

a trigger element mounted on the searing cam, said trigger element, upon impact with said memory block when said back frame is in said back frame upright position, disengages said sear element from said locking element allowing said locking arm to move from said travel position to said engagement position;

a lost motion element providing communication between said sear com and said lifting cam such that said trigger element, upon impact with said memory block when said back frame is in said back frame dumped forward position, rotates said searing cam such that said trigger element is moved over said memory block without damage; and a drive axle rotatably mounted to said adjustment track, said lift cam and said actuator arm mounted to said drive axle.

6. An automotive easy-entry assembly described in claim 1, wherein said actuator arm is placed in communication with said back frame by way of an actuator cable.

7. An automotive easy-entry assembly comprising:

a seat pan;

a back frame rotatably attached to said seat pan, said back frame rotatable between a back frame upright position and a back frame dumped forward position;

a secured track comprising a plurality of engagement slots;

a memory block mounted to said secured track;

an adjustment track mounted to said seat pan and slidably engaging said secured track;

a locking arm including one or more engagement teeth, said locking arm rotatably mounted to said adjustment track and movable between an engagement position, wherein said one or more engagement teeth are positioned within a group of said plurality of engagement slots, and a travel position, wherein said adjustment track is free to slide along said secured track;

an actuator arm rotatable about an actuator axis, said actuator arm in communication with said back frame such that as said back frame is moved from said back frame upright position to said back frame dumped forward position said actuator arm is moved from an actuator stable position to an actuator active position;

a lifting cam in communication with said actuator arm and said locking arm such that as said actuator arm is moved into the actuator active position said lifting cam moves said locking arm into said travel position;

a locking cam in communication with said lifting cam, said locking cam including a locking element;

a searing cam rotatable about a searing cam axis and including a sear element, said searing cam in communication with said lifting cam such that said sear element engages said locking element when said locking arm is within the travel position;

a trigger element mounted on the searing cam, said trigger element, upon impact with said memory block when said back frame is in said back frame upright position, disengages said sear element from said locking element allowing said locking arm to move from said travel position to said engagement position; and a lost motion element providing communication between said sear cam and said lifting cam such that said trigger element, upon impact with said memory block when said back frame is in said back frame dumped forward position, rotates said searing cam such that said trigger element is moved over said memory block without damage;

wherein said lift cam is placed in communication with said locking arm by way of a lifting tab formed on said lift cam engaging a locking arm pin mounted on said locking arm.

8. An automotive easy-entry assembly as described in claim 1, wherein:

said secured track comprises a secured left track and a secured right track; and said adjustment track comprises an adjustment left track and an adjustment right track.

9. An automotive easy-entry assembly as described in claim 8, further comprising:

a drive axle rotatably mounted between said adjustment left track and said adjustment right track;

a first locking arm rotatably mounted to said adjustment left track;

a second locking arm rotatably mounted to said adjustment right track;

a first lifting cam mounted to said drive axle and in communication with said first locking arm; and a second lifting cam mounted to said drive axle and in communication with said second locking arm.

10. An automotive easy-entry assembly comprising:

a seat pan, a back frame rotatably attached to said seat pan, said back frame rotatable between a back frame upright position and a back frame dumped forward position;

a first secured track comprising a plurality of first engagement slots;

a second secured track comprising a plurality of second engagement slots;

a memory block mounted to said first secured track;

a first adjustment track mounted to said seat pan and slidably engaging said first secured track;

a second adjustment track mounted to said seat pan and slidably engaging said second secured track; and a modular easy entry sub-assembly comprising:

at least one mounting bracket attaching said modular easy entry sub-assembly to said first adjustment track;

a first locking arm including one or more first engagement teeth, said first locking arm rotatably mounted to said first adjustment track and movable between an engagement position, wherein said one or more first engagement teeth are positioned within a group of said plurality of first engagement slots, and a travel position, wherein said first adjustment track is free to slide along said first secured track;

an actuator arm rotatable about an actuator axis, said actuator arm in communication with said back frame such that as said back frame is moved from said back frame upright position to said back frame dumped forward position said actuator arm is moved from an actuator stable position to an actuator active position;

a first lifting cam in communication with said actuator arm and said first locking arm such that as said actuator arm is moved into the actuator active position said first lifting cam moves said first locking arm into said travel position;

a locking cam in communication with said first lifting cam, said locking cam including a locking element;

a searing cam rotatable about a searing cam axis and including a sear element, said searing cam in communication with said first lifting cam such that said sear element engages said locking element when said first locking arm is in the travel position;

a trigger element mounted on the searing cam, said trigger element, upon impact with said memory block when said back frame is in said back frame upright position, disengages said sear element from said locking element allowing said first locking arm to move from said travel position to said engagement position;

a lost motion element providing communication between said sear cam and said first lifting cam such that said trigger element, upon impact with said memory block when said back frame is in said back frame dumped forward position, rotates said searing cam such that said trigger element is moved over said memory block without damage;

second locking arm rotatably mounted to said second adjustment track and movable between an engagement position, wherein said one or more second engagement teeth are positioned within a group of said plurality of second engagement slots, and a travel position, wherein said second adjustment track is free to slide along said second secured track;

a second lifting cam in communication with said actuator arm and said second locking arm such that as said actuator arm is moved into the actuator active position said second lifting cam moves said second locking arm into said travel position; and a drive axle rotatably mounted between said first adjustment track and said second adjustment track by way of a first mounting bracket and a second mounting bracket, said adjustment arm mounted to said drive axle, said first lifting cam mounted to said drive axle, and said second lifting cam mounted to said drive axle.

11. An automotive easy-entry assembly as described in claim 10, further comprising:

a forward adjustment bar in communication with said first locking arm, said forward adjustment bar moving said first locking arm into said travel position when lifted.

12. An automotive easy-entry assembly as described in claim 10, wherein said lost motion element comprises a spring element mounted to and in communication between said sear cam and said first lifting cam.

13. An automotive easy-entry assembly as described in claim 12, wherein said lost motion element further comprises a guide element including a slotted guide mounted to and in communication between said sear cam and said first lifting cam.

14. An automotive easy-entry assembly as described in claim 10, wherein said locking cam and said first lift cam are formed as a single element.

15. An automotive easy-entry assembly as described in claim 10, wherein said actuator arm is placed in communication with said back frame by way of an actuator cable.

16. An automotive easy-entry assembly as described in claim 10, wherein said first lift cam is placed in communication with said first locking arm by way of lifting tab formed on said first lift cam engaging a locking arm pin mounted on said first locking arm.

* * * * *